United States Patent [19]

Tada

[11] Patent Number: 5,671,103
[45] Date of Patent: Sep. 23, 1997

[54] SEALED, DUST-PROOF MAGNETIC DISK DRIVE

[75] Inventor: Kozo Tada, Nagano, Japan

[73] Assignee: Citizen Watch Co., Ltd., Tokyo, Japan

[21] Appl. No.: 583,003

[22] PCT Filed: Jul. 29, 1994

[86] PCT No.: PCT/JP94/01252

§ 371 Date: Jan. 25, 1996

§ 102(e) Date: Jan. 25, 1996

[87] PCT Pub. No.: WO95/04354

PCT Pub. Date: Feb. 9, 1995

[30] Foreign Application Priority Data

Jul. 30, 1993 [JP] Japan ................... 5-208662

[51] Int. Cl.$^6$ .................................... G11B 33/14
[52] U.S. Cl. ................... 360/97.01; 360/97.02
[58] Field of Search ................ 360/97.01–98.01, 360/137, 900, 903, 904; 369/75.1

[56] References Cited

U.S. PATENT DOCUMENTS

| | | | |
|---|---|---|---|
| 4,812,932 | 3/1989 | Hishinuma et al. | 360/97.01 |
| 5,007,946 | 4/1991 | Babini | 360/97.02 |
| 5,025,335 | 6/1991 | Stefansky | 360/97.01 |
| 5,079,655 | 1/1992 | Yagi | 360/97.01 |
| 5,124,855 | 6/1992 | Dew et al. | 360/97.02 |
| 5,235,481 | 8/1993 | Schmitz | 360/97.02 |
| 5,306,108 | 4/1994 | Goldman | 411/369 |
| 5,366,200 | 11/1994 | Scura | 360/97.02 |
| 5,454,157 | 10/1995 | Ananth et al. | 28/467 |
| 5,469,311 | 11/1995 | Nishida et al. | 360/97.02 |
| 5,524,785 | 6/1996 | Georges | 220/223 |
| 5,537,270 | 7/1996 | Morehouse et al. | 360/97.02 |

FOREIGN PATENT DOCUMENTS

| | | | |
|---|---|---|---|
| 0 248 650 | 12/1987 | European Pat. Off. . | |
| 0 253 626 | 1/1988 | European Pat. Off. . | |
| 0 427 490 | 5/1991 | European Pat. Off. . | |
| 60-223093 | 11/1985 | Japan | 360/97.02 |
| 2-201790 | 8/1990 | Japan | 360/97.02 |
| 2-249192 | 10/1990 | Japan | 360/97.02 |
| 3-44883 | 2/1991 | Japan . | |
| 5-507170 | 10/1993 | Japan . | |
| 91/18390 | 11/1991 | WIPO . | |

*Primary Examiner*—Jefferson Evans
*Attorney, Agent, or Firm*—Armstrong, Westerman, Hattori, McLeland & Naughton

[57] ABSTRACT

Through-holes (2) are bored in given positions of a disk enclosure (101), and sealing members (1) having threaded holes (6) in which screw members (3) for mounting external components can be screwed are provided. The through-holes (2) are sealed by the sealing members (1), and a printed circuit board (116) and other external components are mounted on the outer surface of the disk enclosure (101) by screwing screw members (3) into the threaded holes (6). Thus, it is possible to prevent dust particles from entering the interior of the disk enclosure, and the external components can be fixed to the disk enclosure (101) easily without increasing the manufacturing cost due to the increased number of machining steps, and without unduly increasing the size of the device.

4 Claims, 7 Drawing Sheets

SEALED, DUST-PROOF MAGNETIC DISK DRIVE

BACKGROUND OF THE INVENTION

1. Field of the Invention

The present invention relates to a magnetic disk drive having a magnetic head capable of reading information from and writing information on a magnetic disk, particularly to a magnetic disk drive which is improved in structure to mount external components such as a printed circuit board on a disk enclosure.

2. Description of the Related Art

Figure 4:
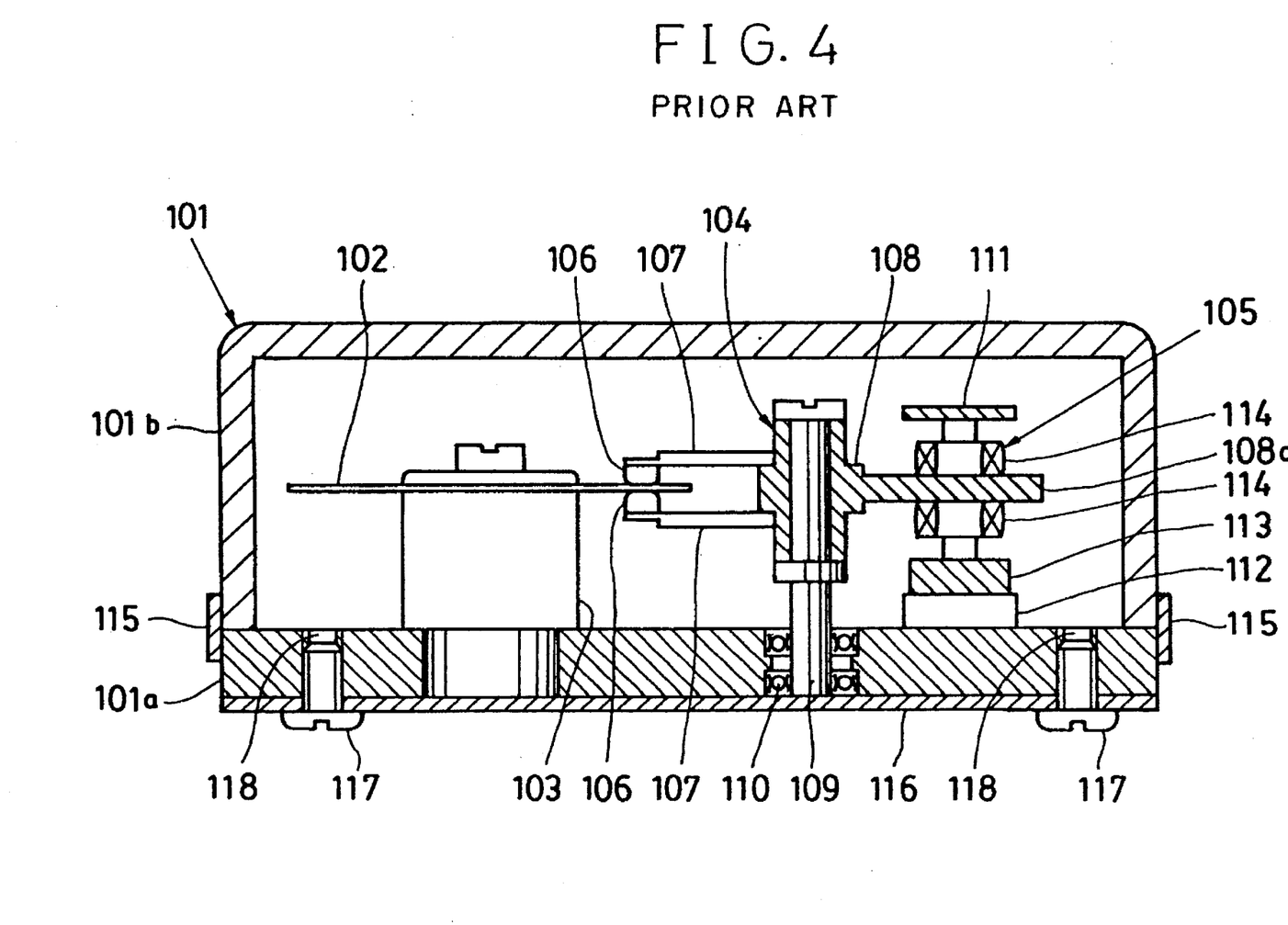
FIG. 4 is a front cross-sectional view of a conventional magnetic disk drive.
Figure 5:
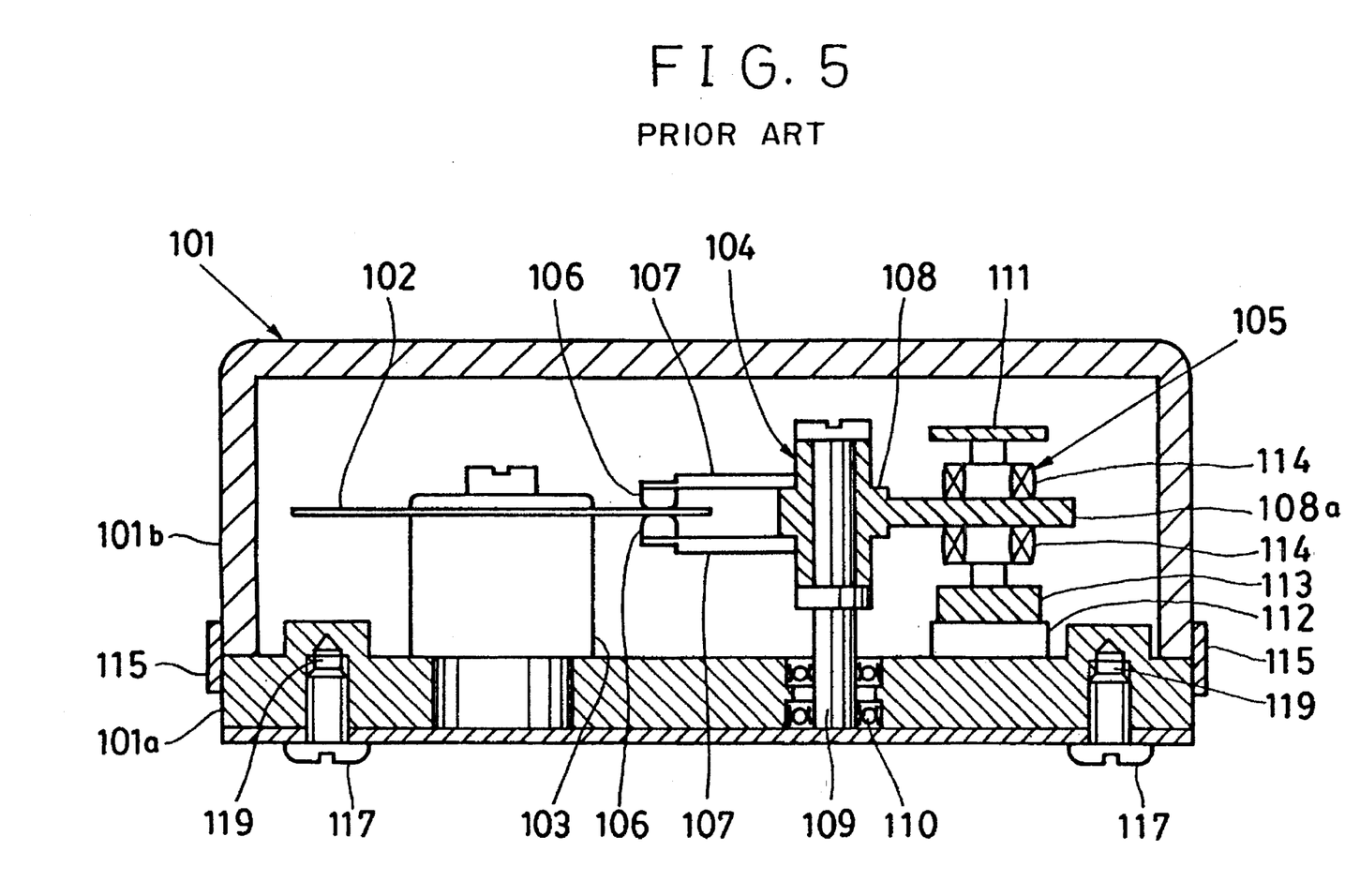
FIG. 5 is a front cross-sectional view of another conventional magnetic disk drive.
Figure 6:
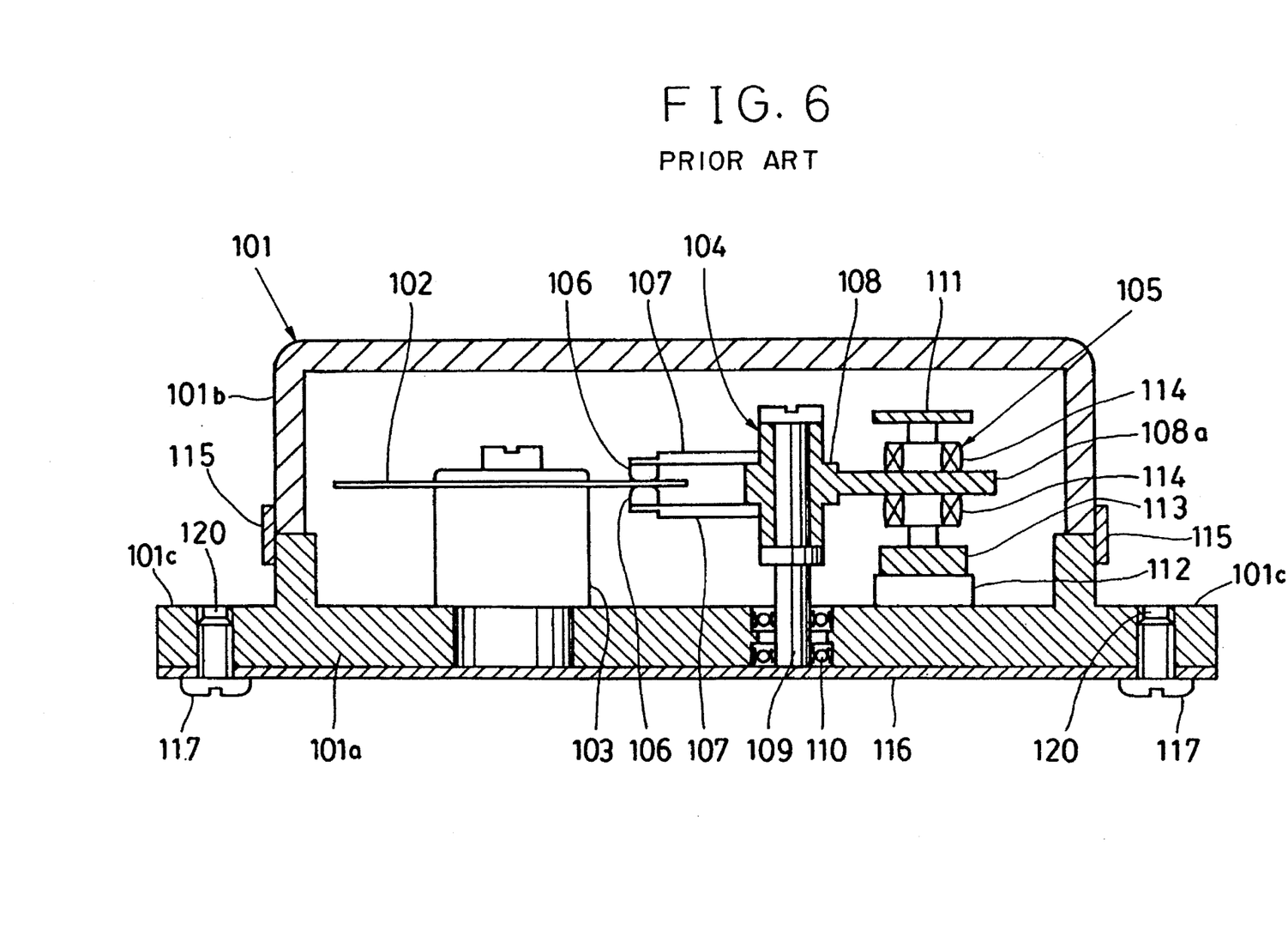
FIG. 6 is a front cross-sectional view of a still another conventional magnetic disk drive.

FIGS. 4 through 6 are front cross-sectional views showing conventional magnetic disk drives.

A disk enclosure 101 of the magnetic disk drive generally comprises a base 101a and a cover 101b. A magnetic disk 102, a spindle motor 103 serving as a means for rotatably driving the magnetic disk 102, a support mechanism 104 for supporting a magnetic head 106, a voice coil motor 105 serving as a mechanism for driving the magnetic head 106 are respectively disposed in the disk enclosure 101 with respect to the base 101a.

The magnetic disk 102 is clamped by the spindle motor 103 and is rotatably driven by the spindle motor 103 at a given speed. The support mechanism 104 for supporting the magnetic head 106 comprises a suspension 107, an arm body 108, a swing shaft, i.e., a rotating central shaft 109 and a bearing 110.

The magnetic head 106 is supported by an end of the suspension 107 while keeping an appropriate interval between itself and a surface of the magnetic disk 102 due to balance between a lift caused by air current involved in a rotation of the magnetic disk 102 and a load applied by the suspension 107 so as to read information from and write information on the magnetic disk 102.

The arm body 108 holds a base end portion of the suspension 107, and is fixed to the rotating central shaft 109. The rotating central shaft 109 is rotatably supported by the bearing 110 in the base 101a. Accordingly, the arm body 108 rotates together with the rotating central shaft 109 so as to allow the magnetic head 106 to access the magnetic disk 102 at an arbitrary position of the magnetic disk 102.

The voice coil motor 105 comprises an upper yoke 111, a lower yoke 112, a permanent magnet 113 and a coil 114. The coil 114 is fixed to an arm 108a extending from the arm body 108. The arm 108a together with the coil 114 is urged due to a magnetic force which is generated when the coil 114 is energized, so as to rotate the arm body 108 about the rotating central shaft 109. The magnetic head 106 is positioned radially at an arbitrary position with respect to the magnetic disk 102 when the arm body 108 is rotated.

An inner space of the disk enclosure 101 comprising the base 101a and cover 101b must be always clean, therefore the disk enclosure 101 is airtightly structured.

That is, when information is read from or written on the magnetic disk 102, a gap defined between the magnetic head 106 and a surface of the magnetic disk 102 is adjusted to be a very small distance, i.e., normally 0.1 μm or less. Accordingly, if ambient dust particles such as tobacco smoke each having a small diameter enter between the magnetic disk 102 and the magnetic head 106, the magnetic head 106 contacts the surface of the magnetic disk 102 to generate a crash, which causes the likelihood of destruction of precious information stored on the magnetic disk 102.

Accordingly, a coupling portion between the base 101a and the cover 101b is bonded by an adhesive tape 115, etc., so as to completely seal a gap defined therebetween as disclosed in Japanese Patent Laid-Open Publication No. 3-171491.

A printed circuit board 116 includes a circuit for driving the spindle motor 103 and the voice coil motor 105, and it is fixed to an outer bottom portion of the base 101a by set screws 117. The reason for fixedly mounting the printed circuit board 116 on the outer bottom portion of the base 101a instead of accommodating it inside the disk enclosure 101 is that firstly, dust attached to the printed circuit board 116 is difficult to be removed completely even if the printed circuit board 116 is subjected to a cleaning process, secondly the printed circuit board 116 generates a large amount of heat which makes it difficult to compensate the temperature of components provided inside the disk enclosure 101, thirdly the layout and the airtight structure of the printed circuit board 116 do not cause any trouble even if the printed circuit board 116 is provided outside the disk enclosure 101, since it is sufficient to connect by several signal lines.

However, there are the following problems in the conventional magnetic disk drives disclosed in FIGS. 4 through 6, particularly in a structure for mounting the printed circuit board 116 on the disk enclosure 101.

Figure 7:
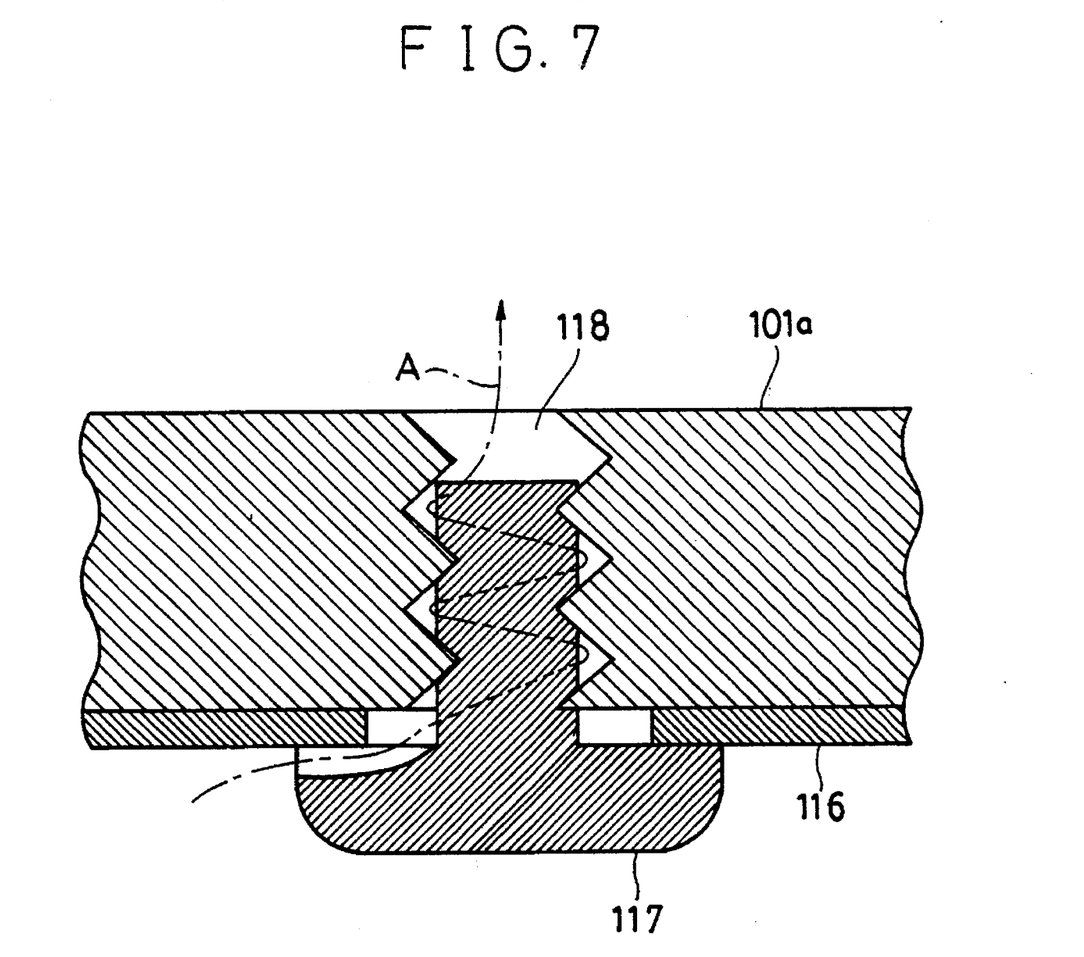
FIG. 7 is an enlarged cross-sectional view of a conventional screw mount.

Firstly, in the magnetic disk drive shown in FIG. 4, since threaded holes 118 into which the set screws 117 are screwed for mounting the printed circuit board 116 on the disk enclosure 101 are defined in a bottom portion of the base 101a by penetrating or boring the base 101a, this causes a problem in that minute dust enters the interior of the disk enclosure 101 through engaging gaps defined between the set screws 117 and threaded holes 118 as shown in the arrow A of FIG. 7.

That is, contact surfaces between heads of the set screws 117 and the printed circuit board 116 and engaging portions or gaps between the set screws 117 and the threaded holes 118 are not sealed completely so as to create entering passages denoted at the arrow A. Accordingly, there is a likelihood that dust having a diameter of several μm may enter the interior of the disk enclosure 101 through the aforementioned gaps.

In the magnetic disk drive shown in FIG. 5, threaded holes 119 are defined in the base 101a without boring the base 101a, and the set screws 117 are screwed into the threaded holes 119 so as to fixedly mount the printed circuit board 116 on the base 101a. In such a structure, there is no likelihood of dust entering from the threaded holes 119.

However, since machining of the spindle motor 103 for mounting the spindle motor 103 on the base 101a and machining of the bearing 110 for providing the bearing 110 on the base 101a must be performed from an upper surface side of the base 101a, and machining of the threaded holes 119 must be performed from a lower surface side of the base 101a, machining actions cannot be performed by the same machining step or process. As a result, the number of machining steps is increased, which causes problems in that machining is complicated, machining cost is increased, and machining time is increased.

In the magnetic disk drive shown in FIG. 6, a projection portion 101c is formed by increasing outer dimensions of the base 101a and threaded holes 120 are provided in the projection portion 101c, which thus solves the problems of the magnetic disk drives shown in FIGS. 4 and 5.

However, it has been desirable to down-size magnetic disk drives with the spread thereof as a storage device of a note-book type small word processor, a small-sized personal computer, etc. Even if the base 101a is enlarged to ignore such a demand, it is evident that the magnetic disk drive does not meet the demand of a user, which causes a problem in marketability.

The present invention has been made in view of the aforementioned problems, and it has an object of the present invention to provide a magnetic disk drive capable of preventing dust particles from entering an interior of a disk enclosure and external components including a printed circuit board can be fixedly mounted on the disk enclosure by screws without increasing the manufacturing cost due to the increased number of machining steps, and without causing the device to be larger.

DISCLOSURE OF THE INVENTION

To achieve the above object, the present invention comprises a disk enclosure including therein a magnetic disk, a rotary driving mechanism for rotatably driving the magnetic disk, a magnetic head for reading information from and writing information on the magnetic disk, a supporting means for supporting the magnetic head, a driving means for moving the magnetic head to a position where information is read from the magnetic disk or a position where information is written on the magnetic disk, external components mounted on an outer surface of the disk enclosure by screw members, wherein parts of the outer surface of the disk enclosure on which external components are mounted by screws are characterized as being structured as follows.

That is, the disk enclosure has through-holes bored in given positions thereof, and sealing members having threaded holes in which screw members are screwed.

Thereafter, the through-holes are sealed by the sealing members, and the external components are mounted on the outer surface of the disk enclosure by screwing screw members into the threaded holes of the sealing members.

With such a structure, the through-holes can be machined from the inner surface side of the disk enclosure in the same step as a machining step for machining the disk enclosure on which a rotary driving mechanism and a magnetic head supporting means are mounted, the thread holes can be easily machined or bored in the disk enclosure without increasing the number of machining steps.

Further, the through-holes may penetrate the interior of the disk enclosure without any trouble, which does not cause the device to be larger.

Still further, since the through holes are sealed by the sealing members, dust does not enter the interior of the disk enclosure.

The external components are fixedly mounted on the outer surface of the disk enclosure by screw members which are screwed into the threaded holes defined in the sealing members.

If the sealing members are screwed midway into and fitted to the through holes from the interior of the disk enclosure, unscrewed portions remaining in the through holes can be used as positioning holes relative to a fixed jig when the components are mounted on the disk enclosure.

The sealing members are fitted to the through holes by pressing the sealing members into or bonding the sealing members to the through holes.

DETAILED DESCRIPTION OF THE PREFERRED EMBODIMENTS

The present invention will be now described more in detail with reference to the attached drawings.

Figure 1:
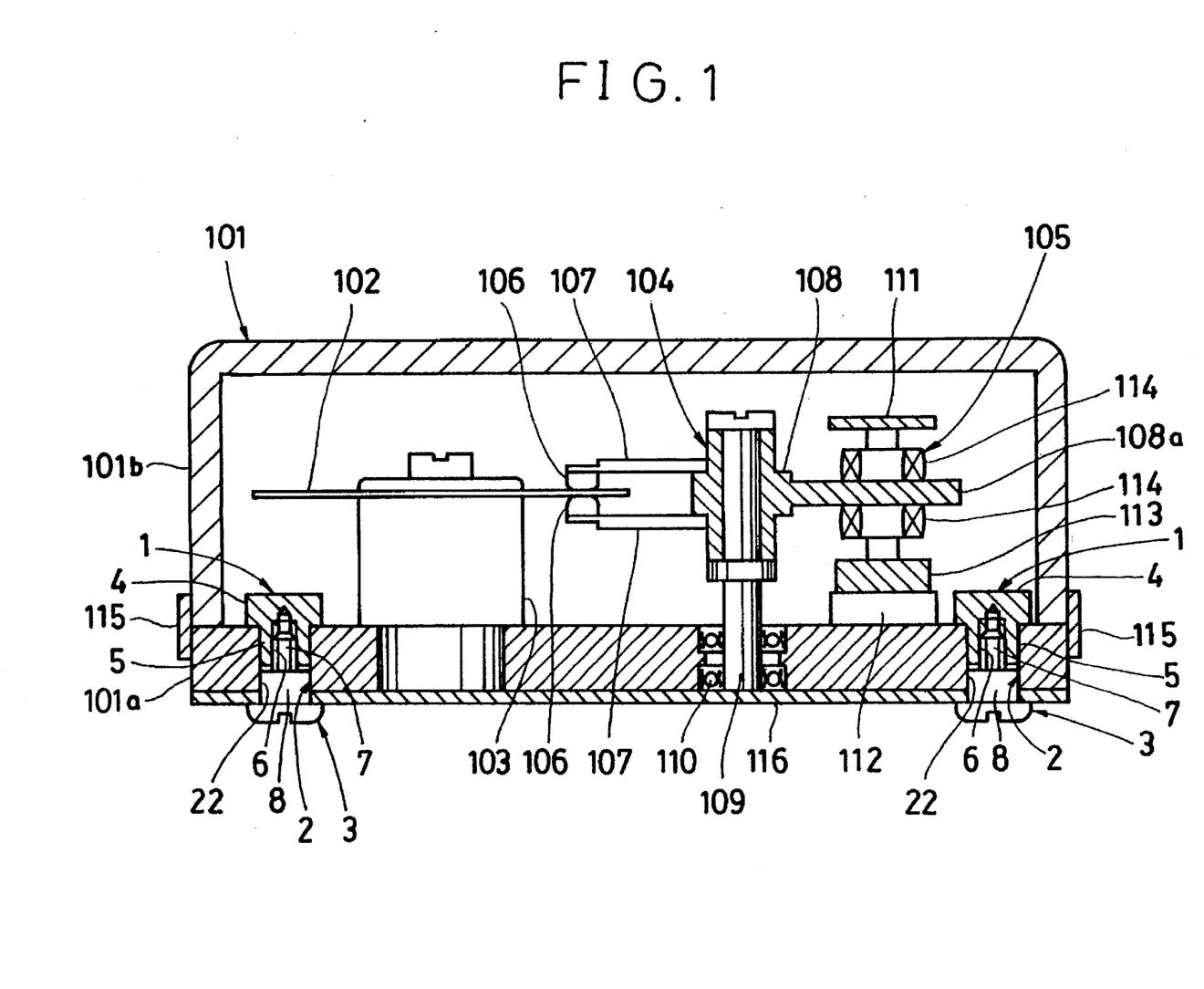
FIG. 1 is a front cross-sectional view of a magnetic disk drive according to an embodiment of the present invention.
Figure 2:
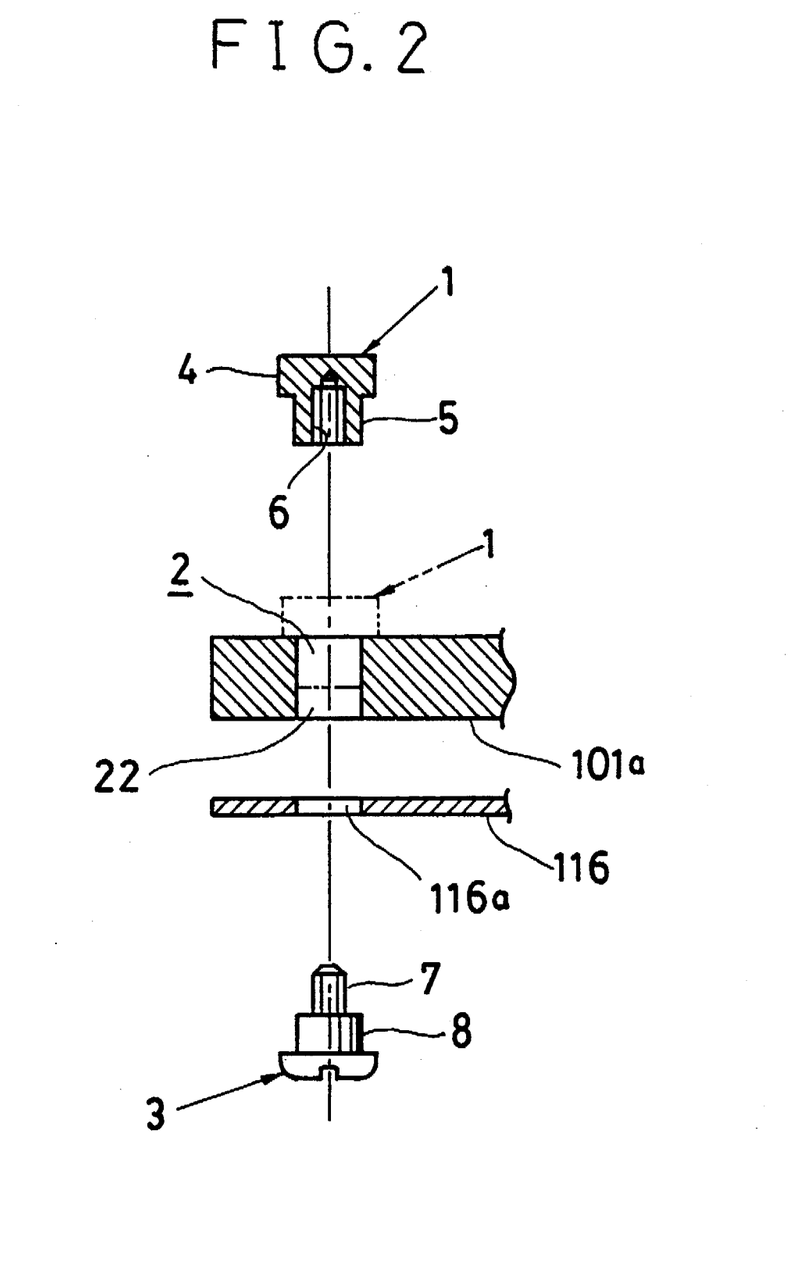
FIG. 2 is an exploded enlarged cross-sectional front view of a structure of an external component mounting portion according to the magnetic disk drive shown in FIG. 1.
Figure 3:
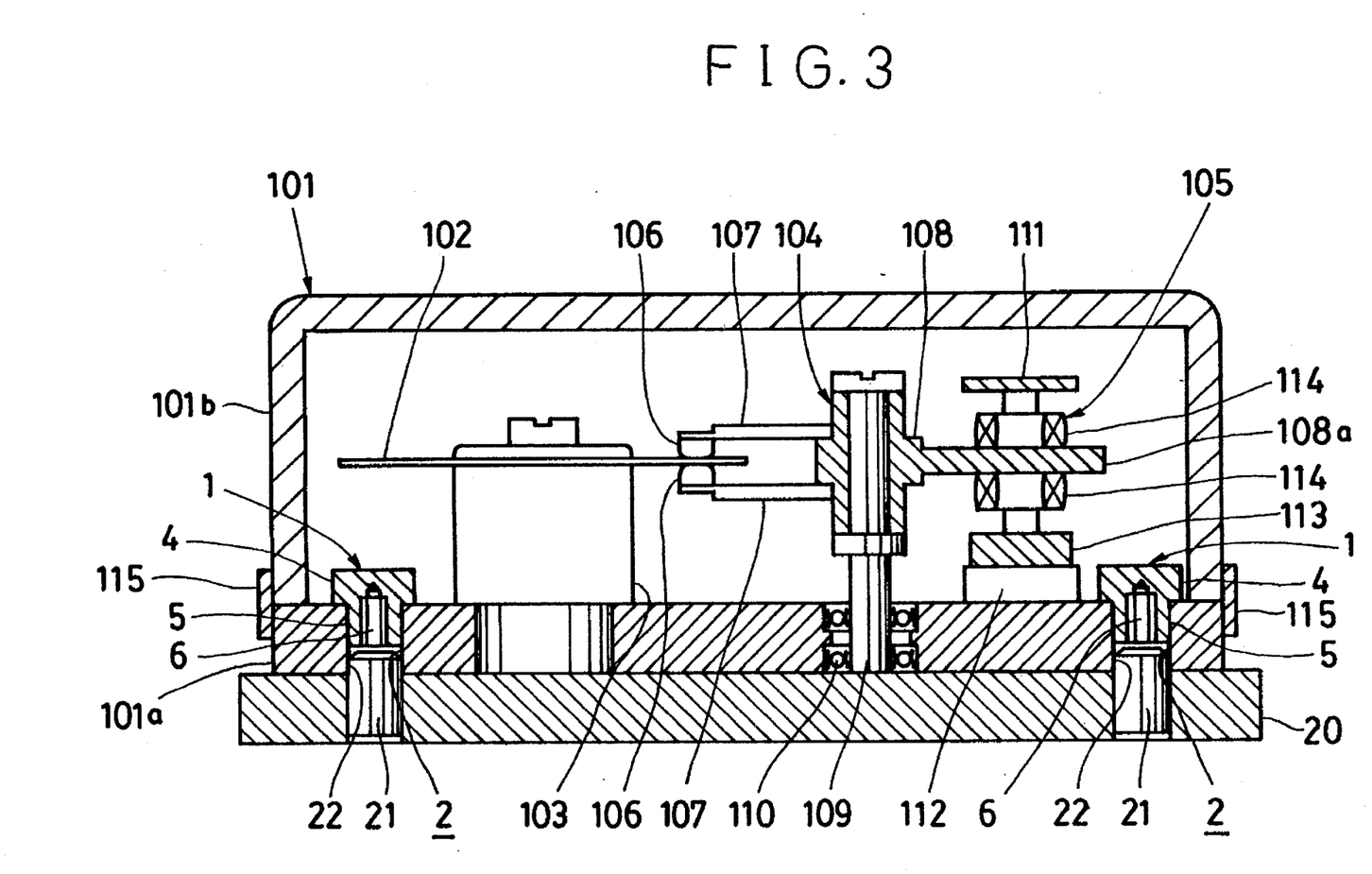
FIG. 3 is a cross-sectional front view showing operations of threaded holes of the magnetic disk drive shown in FIG. 1.

A preferred embodiment of the present invention is illustrated in FIGS. 1 through 3. In the magnetic disk drive shown in these figures, reference numerals which are the same as and correspond to those of the convention magnetic disk drives as shown in FIGS. 4 through 6 are denoted at the same reference numerals and detailed explanations thereof are omitted.

The magnetic disk drive according to the present embodiment has a structure in that through holes 2 are bored in given positions of a disk enclosure 101, and sealing members 1 are fitted and inserted into the through holes 2. Such a structural portion is illustrated in exploded view in FIG. 2.

The through-holes 2 of the base 101a can be bored in the base 101a from the inner surface side of the base 101a in the same machining steps as those for machining the base 101a on which a spindle motor 103 serving as a rotary means for rotating a magnetic disk 102, a support mechanism 104 for supporting a magnetic head 106, a voice coil motor 105 serving as a driving mechanism for driving the magnetic head 106 are mounted.

Each of the sealing members 1 has a collar portion 4, an insertion portion 5 and a threaded hole 6 extending axially from the end of the insertion portion 5. The threaded hole 6 is defined in the sealing member 1 and it extends in the axial direction thereof by a given length but it does not penetrate the sealing member 1.

The sealing member 1 is fitted and pressed into the through-hole 2 which is bored in the base 101a or bonded and fixed to the through-hole 2 by an adhesive so that an engaging portion between the sealing member 1 and the through hole 2 is closely brought into contact with each other. Accordingly, there is no likelihood that dust enters the interior of the disk enclosure 101.

Only the insertion portion 5 of the sealing member 1 is engaged into the through-hole 2 from the inner surface of the disk enclosure 101. The insertion portion 5 has a height which is shorter than the thickness of the base 101a. Accordingly, the through-hole 2 remains hollow between the end surface of the insertion portion 5 and an opened outer surface of the through-hole 2, so that the hollow portion forms a positioning hole 22.

A stepped set screw 3 (screw member) is screwed into the threaded hole 6 of the sealing member 1. The stepped set screw 3 includes a threading portion 7 to screw into the threaded hole 6 and a positioning portion 8 to engage into the positioning hole 22 of the through hole 2. A mounting hole 116a for engaging with the positioning portion 8 is bored into a printed circuit board 116 which is to be mounted on the base 101a by the stepped set screw 3.

Accordingly, the printed circuit board 116 can be fixedly mounted on the outer surface of the base 101a if the positioning portions 8 of the stepped set screws 3 are engaged in the positioning holes 22 and the threaded portions 7 are screwed into the threaded holes 6 of the sealing members 1 in a state where the positioning portions 8 of the stepped set screws 3 are engaged in the mounting holes 116a of the printed circuit board 116.

Positions where the through holes 2 are formed, namely, positions where the sealing members 1 are fixed may be set so as not to interfere with the internal components such as the spindle motor 103, the support mechanism 104 for supporting the magnetic head 106, the voice coil motor 105 respectively incorporated into the disk enclosure 101. It is not necessary to take the trouble to enlarge outer dimensions of the magnetic disk drive to expose or to provide such through holes or sealing members outside the disk enclosure 101.

The positioning holes 22 can be used for positioning between a fixed jig 20 and the base 101a when the magnetic disk drive is assembled as shown in FIG. 3.

That is, the magnetic disk drive is required to be manufactured at a low cost associated with the low price of a word processor, a personal computer, etc. Accordingly, the components are automatically mounted on the base 101a.

According to the preferred embodiment, positioning between the fixed jig 20 for mounting the base 101a on an automatic assembling machine and the base 101a can be performed using the positioning holes 22, whereby the accurate positioning of the base 101a can be performed, which enhances high accuracy of automatic assembling operations.

That is, a positioning pin 21 projecting from the fixed jig 20 is engaged in the positioning hole 22 defined in the base 101a so as to position the base 101a relative to the fixed jig 20.

The present invention is not limited to the preferred embodiment disclosed above. For example, the sealing member 1 is not limited to that comprising the collar portion 4 and the insertion portion 5, e.g. the insertion portion 5 is pressed into the through hole 2 in full length thereof so as to omit the positioning hole 22. Further, the components mounted on the outer surface of the disk enclosure by the screw members are not limited to the printed circuit board but include various external components.

The present invention can be utilized for various magnetic disk drives which need mounting of the external components by the screw members on the outer surface of the disk enclosure.

With the arrangement of the magnetic disk drive according to the present invention, it is possible to prevent dust particles from entering the interior of the disk enclosure, and is possible to fixedly mount the external components on the disk enclosure easily without increasing the manufacturing cost due to the increased number of machining steps, and without causing the device to be larger.

I claim:

1. A magnetic disk drive comprising a disk enclosure including therein a magnetic disk, a rotary driving mechanism for rotatably driving the magnetic disk, a magnetic head for reading information from and writing information on the magnetic disk, a supporting means for supporting the magnetic head, a driving means for moving the magnetic head to a position where information is read from the magnetic disk or a position where information is written on the magnetic disk, and external components mounted on an outer surface of the disk enclosure by screw members, wherein the disk enclosure has through-holes bored in given positions thereof and extending from an interior to an exterior of the disk enclosure, and sealing members having threaded holes in which said screw members are screwed, and wherein the through-holes are sealed by the sealing members, and said external components are mounted on an outer surface of the disk enclosure by screwing said screw members into the threaded holes of the sealing members.

2. A magnetic disk drive according to claim 1, wherein the sealing members are screwed midway into the through-holes from an interior of the disk enclosure.

3. A magnetic disk drive according to claim 1 or 2, wherein the sealing members are fitted and pressed into the through-holes.

4. A magnetic disk drive according to claim 1 or 2, wherein the sealing members are bonded and fixed to the through-holes.

* * * * *